Patented Dec. 16, 1952

2,622,067

UNITED STATES PATENT OFFICE 2,622,067

EMULSIFIABLE OIL COMPOSITIONS

Ralph V. White, Pitman, and Phillip S. Landis, Glassboro, N. J., assignors to Socony-Vacuum Oil Company, Incorporated, a corporation of New York No Drawing. Application September 15, 1949, Serial No. 115,948

11 Claims. (Cl. 252—51.5)

This invention relates, broadly, to water-in-oil emulsions, and it is more particularly concerned with emulsifiable oils containing a minor proportion of the reaction product obtained by reacting a long-chain aliphatic monocarboxylic acid with a polyalkylenepolyamine.

As is well known to those familiar with the art, two liquids which are mutually insoluble may be emulsified by prolonged mechanical agitation. However, if the resulting emulsion contains much more than about one per cent of the disperse phase, it is unstable and the component liquids soon separate into two layers. Thus, a small portion of oil in a large volume of water may be emulsified by shaking. However, on standing, the minute droplets of oil soon coalesce and the liquids separate into two phases. In general, the larger the proportion of oil in the mixture, the more unstable the emulsion becomes.

Although stable emulsions of two pure immiscible liquids cannot ordinarily be prepared, they can readily be stabilized by the addition of a third substance, known as an emulsifying agent or an emulsifier, to one of the liquid phases. When the emulsifying agent is added to the oil phase, the resultant oil is known as an emulsifiable oil. With the aid of such materials, two main types of emulsions have heretofore been prepared; namely, emulsions in which oil is dispersed in water, generally referred to as the oil-in-water type, and emulsions in which water is dispersed in oil, known as the water-in-oil type. The emulsifying agent employed in each instance will be dependent upon the particular type of emulsion being produced. Materials which are excellent emulsifiers for the water-in-oil type emulsion generally are ineffective to stabilize an oil-in-water emulsion and, conversely, agents which are satisfactory for stabilizing oil-in-water type emulsions are quite often useless for imparting stability to a water-in-oil type emulsion. For example, it is known that the alkali metal soaps are excellent emulsifying agents for oil-in-water emulsions, whereas they are unsatisfactory for water-in-oil emulsions. On the other hand, although the soaps of the heavy metals are not good emulsifying agents for producing oil-in-water emulsions, they are very effective for stabilizing water-in-oil emulsions. Accordingly, it will be evident that, in stabilizing emulsions of oil and water with an emulsifier, the particular type of emulsion being produced is a factor of considerable importance. The present invention is specifically concerned with the production of emulsifiable oils which produce water-in-oil type emulsions.

The term "oil" is used herein in the broad sense usually accorded that term in the emulsion art; i. e., to designate any liquid which is insoluble in water. Accordingly, the oil phase of the emulsions of this invention can be composed of mineral lubricating oils, or various fractions thereof; vegetable oils, such as cottonseed oil, castor oil, linseed oil, tung oil, soy bean oil, oiticica oil, etc.; animal oils, such as sperm oil, oleo oil, etc.; fish oils, such as codliver oil, porpoise oil, salmon oil, etc.; petroleum waxes, such as slack wax and paraffin wax; natural waxes, such as carnauba wax, beeswax, Japan wax, etc.; and, in general, any of those materials in the art capable of making up the oil phase of a water-in-oil emulsion.

In accordance with the present invention, it has now been discovered that the reaction product obtained by reacting a long chain aliphatic monocarboxylic acid with a polyalkylenepolyamine is an excellent emulsifying agent for stabilizing emulsions of the water-in-oil type. It has now been found that the incorporation of a minor amount of the reaction product of a long chain aliphatic monocarboxylic acid and a polyalkylenepolyamine into an oil imparts unusually good emulsive characteristics thereto.

Accordingly, it is a broad object of the present invention to provide stable water-in-oil emulsions. Another object is to provide new emulsifiable oils. A specific object is to provide an emulsifying agent, which comprises the reaction product of a long-chain aliphatic monocarboxylic acid with a polyalkylenepolyamine. A more specific object is to provide an emulsifiable oil which comprises an oil and a minor proportion of the aforementioned reaction product. Other objects and advantages of the present invention will become apparent to those skilled in the art, from the following detailed description.

Broadly stated, the present invention provides an emulsifiable oil, which comprises a mineral lubricating oil containing an emulsifying agent obtained by reacting an aliphatic monocarboxylic acid having at least 14 carbon atoms per molecule with a polyalkylenepolyamine having one more nitrogen atom per molecule than there are alkylene groups in the molecule, in a molar proportion varying between about 1:1, respectively, and about X:1, respectively, X representing the number of nitrogen atoms in the polyalkylenepolyamine reactant.

The aliphatic monocarboxylic acid reactant utilized herein is an acid of relatively high molecular weight containing at least 14 carbon atoms, or its acid anhydride or acid halide. The aliphatic monocarboxylic acid reactant can be saturated or unsaturated, branched-chain or straight-chain. Also, it can contain one or more substituent groups such as halogen, hydroxy, amino, nitro, or other radicals which do not appreciably interfere with the reaction of said acid with the aforementioned polyalkylenepolyamines. Particular preference is accorded the aliphatic monocarboxylic acid reactants having a carbon chain length of between about 14 and about 18 carbon atoms. However, it is contemplated that the aliphatic monocarboxylic acid employed can contain up to 30 carbon atoms. Non-limiting examples of the aliphatic monocarboxylic acid reactant are myristic acid; myristoyl bromide; aminomyristic acid; pentadecanoic acid; 4-ketomyristic acid; palmitic acid; 9, 10-dibromopalmitic acid; margaric acid; stearic acid; dibromostearic acid; α-chlorostearic acid; 9, 10, 12, 13-tetrabromostearoyl chloride; linoleic acid anhydride; oleic acid; linolenic acid; elaidoyl chloride; dihydroxy stearic acid; nitro-stearic acid; arachidic acid; clupanodonic acid; behenic acid anhydride; 10-ketobehenic acid; lignoceric acid; selacholeic acid; cerotic acid; heptacosanoic acid anhydride; montanic acid; melissic acid; and ketotriacontanoic acid.

In practice, the monocarboxylic acid reactant can be replaced, in part, by other monocarboxylic acids, or the anhydrides or acid halides thereof, provided that there remains at least one mole of aliphatic monocarboxylic acid reactant having at least 14 carbon atoms per molecule for each mole of polyalkylenepolyamine reactant. For example, a satisfactory product is obtained, in accordance with this invention when one mole of oleic acid and one mole of capric acid are reacted with one mole of tetraethylenepentamine.

The polyalkylenepolyamine reactants utilizable herein are those compounds having the structural formula:

where R is an alkylene radical, or a hydrocarbon radical-substituted alkylene radical, and $n$ is an integer greater than one, there being no upper limit to the number of alkylene groups in the molecule. Those compounds wherein $n$ is an integer between about two and about six are especially valuable for present purposes. Due to their greater commercial availability, the polyethylenepolyamines are particularly preferred. These compounds have the formula:

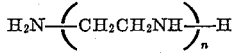

wherein $n$ is an integer varying between about two and about six. In naming the polyalkylenepolyamine reactants, the nitrogen atoms are considered to be attached to the terminal carbon atoms of the main carbon atom chain indicated in each compound name. For example, di-(1-methylamylene)triamine has the structural formula:

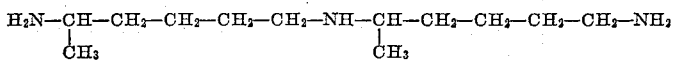

In numbering the main carbon atom chain, the carbon atom attached to the terminal —NH₂ radical is designated as the carbon atom in the 1- position. Similar alkylene groups recur throughout the molecule. Non-limiting examples of the polyalkylenepolyamine reactants are diethylenetriamine; triethylenetetramine; tetraethylenepentamine; di-(methylethylene)triamine; hexapropyleneheptamine; tri-(ethylethylene)tetramine; penta(1-methylpropylene)hexamine; tetrabutylenepentamine; hexa-(1,1-dimethylethylene)heptamine; di-(1-methylbutylene)triamine; pentaamylenehexamine; tri-(1,2,2-trimethylethylene)tetramine; di-(1-methylamylene)triamine; tetra-(1,3-dimethylpropylene)pentamine; penta-(1,5-dimethylamylene)hexamine; di-(1-methyl-4-ethylbutylene)triamine; penta-(1,2-dimethyl-1-isopropylethylene)-hexamine; tetraoctylenepentamine; tri-(1,4-diethylbutylene)tetramine; tridecylenetetramine; tetra-(1,4-dipropylbutylene)pentamine; didodecylenetriamine; tetra-tetradecylenepentamine; penta-(1-methyl-4-nonylbutylene)hexamine; tri-(1,15-dimethylpentadecylene)tetramine; trioctadecylene-tetramine; dieicosylenetriamine; di-(1,2-dimethyl-14-nonyltetradecylene) triamine; di-(1,18-dioctyloctadecylene)triamine; penta-(1-methyl-2-benzylethylene)hexamine; tetra-(1-methyl-3-benzylpropylene)-pentamine; tri-(1-methyl-1-phenyl-3-propylpropylene)tetramine; and tetra-(1-ethyl-2-benzylethylene)pentamine.

The polyalkylenepolyamines can be prepared by several methods well known to the art. One well accepted method involves the reaction of ammonia with an alkyl, or substituted alkyl dihalide. For example, tetraethylenepentamine has been produced by reacting ammonia with ethylene bromide.

Test data tend to establish that the first molecule of the monocarboxylic acid reactant which reacts with the polyethylenepolyamine reactant condenses with both a terminal nitrogen atom and the nitrogen atom adjacent thereto, with the formation of two molecules of water, to form an imidazoline ring. The other molecules of the monocarboxylic acid reactant probably react with the remaining nitrogen atoms to form acylated derivatives. No evidence has been found for the presence of more than one imidazoline ring per molecule. The following example furnishes evidence of the imidazoline structure. Because of the greater ease in fractionating the product, caprylic acid was used. It will be noted that the carbon atom chain of the acid is not ruptured during the reaction. Accordingly, the reaction applies equally well to the higher fatty acids utilizable in the present invention.

*Example 1*

Pure diethylenetriamine (0.5 mole) (51.5 grams) and caprylic acid (0.5 mole) (72 grams) were heated and stirred at 140–150° C. for 11.5 hours, under a benzene reflux. During the course of the reaction, 19.4 milliliters (1.08 moles) of water were removed from the reaction vessel by azeotropic distillation with benzene. The reaction mixture was topped free of benzene. Then, a 100-gram portion of the product was vacuum-distilled. Fraction 3 (25.5 grams), which boiled at 146–149° C. under 1.8 millimeters pressure, had the following analysis corresponding to the emperical formula of the imidazoline compound:

|  | Calculated | Found |
|---|---|---|
| Percent C | 68.24 | 68.08 |
| Percent H | 11.85 | 12.03 |
| Percent N | 19.91 | 19.78 |
| Molecular Weight | 211 | 202 |

A sample of 2-methylimidazoline (M. P. 104.5–105° C.) was prepared in accordance with the method of Ladenberg, Ber., 27, 2952 (1894). This was used as a reference compound.

An infrared spectrum was obtained on a highly-refined white oil dispersion of the reference compound. Another infrared spectrum was obtained for liquid fraction 3. The similarity of the two spectra indicated the presence of the imidazoline ring in fraction 3. On the basis of the results of chemical analyses and of infrared absorption spectra, it is postulated that fraction 3 has the following structure:

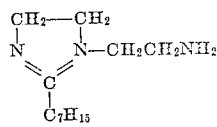

In a similar manner, it can be postulated that a polypropylenepolyamine reactant will react to form a Δ²-tetrahydropyrimidine ring. For example, the reaction between equimolar quantities of dipropylenetriamine and caprylic acid can produce the product:

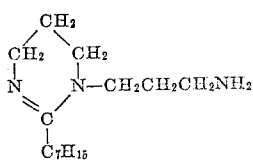

On the other hand, polyalkylenepolyamine reactants having longer alkylene chain lengths probably will not form ring compounds. The reaction products will be acylated, however.

The total number of moles of monocarboxylic acid reactant which is reacted with each mole of polyalkylenepolyamine reactant must not exceed the total number of nitrogen atoms in the polyalkylenepolyamine reactant. Accordingly, the molar proportion of monocarboxylic acid reactant to polyalkylenepolyamine reactant will vary between about 1:1, respectively, and about X:1, respectively, X representing the number of nitrogen atoms in the polyalkylenepolyamine reactant. However, when using polyethylenepolyamine or polypropylenepolyamine reactants this proportion will vary between about 1:1 and about (X-1):1, respectively, since two nitrogen atoms apparently react with the first molecule of the monocarboxylic acid reactant to form a ring compound.

For example, when tetraethylenepentamine is utilized as the polyalkylenepolyamine reactant, one, two, three, or even four moles of a monocarboxylic acid reactant can be reacted with each mole thereof, to produce the reaction products of this invention. If five moles of monocarboxylic acid reactant are used, theoretically, there would be an unreacted mole of monocarboxylic acid reactant. Such a product is not contemplated to be within the scope of the present invention. It must be strictly understood, therefore, that the reaction products of this invention are not pure, definite chemical compounds. The available facts indicate that the reaction involved is much more complex. Evidence has been found for the formation of the imidazoline or the Δ²-tetrahydropyrimidine ring. However, the precise manner of reaction of the other moles of the monocarboxylic acid reactant is purely conjectural. This is substantiated by the fact that some residual acidity is always present in the reaction product. In view of the foregoing, it will be appreciated that any designation assigned to these products, other than a definition comprising a recitation of the process of producing them, is not accurately descriptive of them.

The temperature at which the reaction between the aliphatic monocarboxylic acid reactant and the polyalkylenepolyamine reactant is effected varies, generally, between about 60° C. and about 200° C. It is preferred, however, to carry out the reaction at temperatures varying between about 130° C. and about 160° C.

The time of reaction is dependent on a number of variables, such as the nature of the particular reactants employed, the molar ratio of the reactants, and the temperature of reaction. In practice, the reaction is continued until the formation of water observed during the course of the reaction has substantially ceased. This period of time is, generally, between about 4 hours and about 16 hours, and more often, between about 6 hours and about 10 hours.

As noted hereinbefore, water is formed as a by-product of the reaction between the aliphatic monocarboxylic acid reactant and the polyalkylenepolyamine reactant. In order to facilitate the removal of this water, and in order to effect a more complete reaction, a hydrocarbon solvent which forms an azeotropic mixture with water can be added to the reaction mixture. Heating of the liquid reaction mixture at the preferred reaction temperature is continued until the removal of water by azeotropic distillation has substantially ceased. In general, any hydrocarbon solvent which forms an azeotropic mixture with water can be used. It is preferred, however, to use an aromatic hydrocarbon solvent of the benzene series, such as benzene, toluene, xylene, and the like. The amount of solvent used is a variable and non-critical factor. It is dependent on the amounts of reactants employed and on the reaction temperature selected. An amount of solvent sufficient to support the azeotropic distillation will generally be used, but a large excess must be avoided, since the reaction temperature will be lowered thereby. Water of reaction can also be removed, as the reaction proceeds, by operating under reduced pressure. When operating with a reaction vessel equipped with a reflux condenser provided with a water take-off trap, sufficient reduced pressure can be achieved by applying a slight vacuum to the upper end of the condenser. The pressure inside the system is usually reduced to between about 50 and about 300 millimeters. If desired, water can be removed also from the reaction mixture by distillation at relatively high temperatures.

In the interest of brevity, the reaction products of this invention are best defined by reciting the reactants and the number of moles of each which are used in the reaction. For example, the reaction product which is produced by reacting two moles of oleic acid with one mole of triethylenetetramine can be defined as the reaction product of oleic acid (II)+triethylenetetramine (I). In addition to the products described in the illustrative examples, set forth hereinafter, non-limiting examples of the reaction products contemplated herein are those products produced by reacting the following combinations of reactants: myristic acid (II)+diethylenetriamine (I); ketotriacontanoic acid (III)+tetraethylenepentamine (I); myristoyl bromide (V)+hexapropyleneheptamine (I); melissic acid (VI)+penta-(1-methylpropylene)-hexamine (I); aminomyristic acid (II)+hexa-(1,1-dimethylethylene)heptamine (I); montanic acid (I)+tri-(1,2,2-trimethylethylene) tetramine (I); pentadecanoic acid (II)+tetra- (1,3-dimethylpropylene)-pentamine (I); heptacosanoic acid anhydride (I) +di-(1-methyl-4-ethylbutylene)triamine (I); 4-ketomyristic acid (IV) +tetraoctylenepentamine (I); cerotic acid (II) +tetra-(1,4-dipropylbutylene pentamine (I); palmitic acid (V) +tetra-(tetradecylene)pentamine (I); selacholeic acid (I) +tri-(1,15-dimethylpentadecylene)tetramine (I); 9,10-dibromopalmitic acid (II) +dieicosylenetriamine (I); lignoceric acid (I) +di-(1,18-dioctyloctadecylene)-triamine (I); margaric acid (III) +tetra-(1-methyl-3-benzylpropylene)-pentamine (I); 10-ketobehenic acid (I) +tetra-(1-ethyl-2-benzylethylene) pentamine (I); stearic acid (III) +triethylenetetramine (I); behenic acid anhydride (I) +di-(methylethylene)triamine (I); dibromostearic acid (I) +tri-(ethylethylene)tetramine (I); clupanodonic acid (II) +tetrabutylenepentamine (I); α-chlorostearic acid (I) +di-(1-methylbutylene)triamine (I); arachidic acid (IV) +pentaamylenehexamine (I); 9,10,12,13-tetrabromostearoyl chloride (I) +di-(1-methylamylene)triamine (I); nitrostearic acid (II) +penta-(1,5-dimethylamylene)hexamine (I); linoleic acid anhydride (V) +penta-(1,2-dimethyl-1-isopropylethylene)hexamine (I); di-hydroxystearic acid (I) +tri-(1,4-diethylbutylene)tetramine (I); oleic acid (IV) +tridecylenetetramine (I); elaidoyl chloride (III) +didodecylenetriamine (I); and linolenic acid (I) +trioctadecylenetetramine (I).

The amount of the afore-described reaction products used as emulsifying agents is generally a function of the specific product being employed and of the nature of oil used; as well as of the extent and type of emulsion desired. Ordinarily, the amount of emulsifier employed is between about 0.01 and about 10 per cent by weight and preferably between about 0.05 and about 0.5 per cent by weight. In addition to the afore-described reaction products, the emulsifiable oils of this invention can contain minor amounts of other materials, such as odorants, coloring matter, diluents, extenders, and the like.

The following specific examples are for the purpose of illustrating the present invention, and of demonstrating the advantages thereof. It must be strictly understood that this invention is not to be limited to the paricular reactants, and molar proportions employed, or to the operations and manipulations set forth therein. As those skilled in the art will readily understand a wide variety of other reactants and molar proportions can be used, as set forth hereinbefore.

*Example 2*

To a reaction vessel provided with a stirrer, a thermometer and a reflux take-off trap, were added 85.2 grams (0.3 mole) of stearic acid and 18.9 grams (0.1 mole) of tetraethylenepentamine. The contents of the vessel were heated to a temperature of 148° C. and sufficient benzene was thereafter added to effect refluxing at a pot temperature of 145–148° C. The reaction was continued until 6.2 milliliters of water had collected. The total reaction time was 10.75 hours. The solvent (benzene) was removed from the resulting mixture under reduced pressure at a pot temperature of 145° C. The solid residue thus obtained had a neutralization number of 41.5.

*Example 3*

To a reaction vessel provided with a stirrer, a thermometer and a reflux take-off trap, were added 45.6 grams (0.2 mole) of myristic acid and 14.6 grams (0.1 mole) of triethylenetetramine. The contents of the vessel were heated to a temperature of 140° C. and sufficient benzene was thereafter added to allow refluxing at 140° C. for 8 hours. The total amount of water collected in the take-off trap at the end of this period of time was 6.3 milliliters. The benzene solvent was removed under reduced pressure at a pot temperature of 145° C. The solid residue had a neutralization number of 9.4.

*Example 4*

To a reaction vessel provided with a stirrer, a thermometer and a reflux take-off trap were added 56.4 grams (0.2 mole) of oleic acid and 10.3 grams (0.1 mole) of diethylenetriamine. The contents of the vessel were heated to a temperature of 145° C. and sufficient benzene was added to maintain a reflux at this temperature. The reaction was continued at 140–145° C. for 8 hours, 5.4 milliliters of water being collected. The benzene was removed from the resulting mixture while the same was held under reduced pressure at a temperature of 140° C. The solid residue so obtained had a neutralization number of 26.5.

*Example 5*

To a reaction vessel provided with a stirrer, a thermometer, and a reflux take-off trap, were added 68.4 grams (0.3 mole) of myristic acid and 18.9 grams (0.1 mole) of tetraethylenepentamine. The contents of the vessel were heated to a temperature of 145° C. and sufficient benzene was added to maintain refluxing at this temperature for 8 hours. The benzene solvent was thereafter removed under reduced pressure while the reaction mixture was held at a temperature of 145° C. The resulting product had a neutralization number of 44.3.

*Example 6*

To a reaction vessel provided with a stirrer, a thermometer, and a reflux take-off trap, were added 112.8 grams (0.4 mole) of oleic acid and 18.9 grams (0.1 mole) of tetraethylenepentamine. The contents of the vessel were heated to a temperature of 140–145° C. Sufficient benzene was added to allow reflux at this temperature. The total reaction time was 8 hours. The benzene was thereafter removed from the resulting reaction product mixture to yield a residue having a neutralization number of 52.6.

*Example 7*

To a reaction vessel provided with a stirrer, a thermometer, and a reflux take-off trap, were added 113.6 grams (0.4 mole) of stearic acid, and 18.9 grams (0.1 mole) of tetraethylenepentamine. The contents of the vessel were heated to a temperature of 155–160° C. and sufficient benzene was thereafter added to maintain reflux at this temperature. The total reaction time was 10 hours. The solvent was removed under reduced pressure to yield a solid residual material having a neutralization number of 53.2.

*Example 8*

Oleic acid (423 grams) (1.5 moles) and tetraethylenepentamine (141.75 grams) (0.75 mole) were reacted, as described in the preceding examples, at a temperature of 145–150° C. for 8 hours. The product so obtained had a neutralization number of 10.4.

*Example 9*

Oleic acid (423 grams) (1.5 mole) and tetraethylenepentamine (283.5 grams) (1.5 moles)

were reacted, as described in Example 2, at a temperature of 144–145° C. for 10 hours. The reaction product mixture so obtained had a neutralization number of 5.4.

*Example 10*

Oleic acid (28.2 grams) (0.1 mole), capric acid (17.2 grams) (0.1 mole) and tetraethylenepentamine (18.9 grams) (0.1 mole) were reacted, as described in Example 2, at a temperature of 140–145° C. for 8.5 hours. The residual product mixture thus obtained had a neutralization number of 18.3.

*Example 11*

Oleic acid (84.6 grams) (0.3 mole) and triethylenetetramine (14.6 grams) (0.1 mole) were reacted, as described in Example 2, at a temperature of 140–145° C. for 8 hours. The reaction product thus obtained had a neutralization number of 34.0.

*Example 12*

Stearic acid (56.8 grams) (0.2 mole) and triethylenetetramine (14.6 grams) (0.1 mole) were reacted, as described in Example 2, at 145–148° C. for 8 hours. The product obtained had a neutralization number of 10.9.

*Example 13*

Oleic acid (112.8 grams) (0.4 mole) and triethylenetetramine (14.6 grams) (0.4 mole) were reacted, as described in Example 2, at a temperature of 140° C. for 8 hours. The reaction product had a neutralization number of 4.8.

*Example 14*

Stearic acid (28.4 grams) (0.1 mole) and triethylenetetramine (14.6 grams) (0.1 mole) were reacted, as described in Example 2, at about 140° C. for 8 hours, to yield a product having a neutralization number of 6.1.

*Example 15*

Palmitic acid (25.6 grams) (0.1 mole) and triethylenetetramine (14.6 grams) (0.1 mole) were reacted, as described in Example 2, at a temperature of 140° C. for 8 hours, yielding a product having a neutralization number of 7.4.

*Example 16*

Stearic acid (28.4 grams) (0.1 mole) and diethylenetriamine (5.15 grams) (0.05 mole) were reacted, as described in Example 2, at a temperature of 140–145° C. for 8 hours. A product having a neutralization number of 19.4 was obtained.

*Example 17*

Oleic acid (28.2 grams) (0.1 mole) and diethylenetriamine (10.3 grams) (0.1 mole) were reacted, as described in Example 2, at 140–145° C. for 9 hours, producing a product having a neutralization number of 7.0.

Emulsifiable oils containing the reaction products described in Examples 2 through 17 were prepared. The general procedure used involved the addition of a minor proportion of one of these reaction products to an oil. Subsequently, the resulting mixture of oil and reaction product was added to water. The total mixture was then agitated to obtain an emulsion of the water-in-oil type. The oil used in preparing the emulsifiable oils of this invention was a mixed petroleum stock consisting of 27 per cent of an acid-treated Coastal Red Oil and 73 per cent of an acid-treated Coastal Distillate stock. The acid-treated Coastal Red Oil had an A. P. I gravity of 21.5 degrees, a maximum pour point of 10° F., a flash point of 440° F. and a Saybolt Universal viscosity of 1170–1225 seconds at 100° F. The acid-treated Coastal Distillate stock had an A. P. I. gravity of 21.5 degrees, a pour point of 400° F. and a Saybolt Universal viscosity of 770 seconds at 100° F. The present invention is, of course, not limited to the use of this particular oil, since, as pointed out hereinbefore, other mineral oil fractions, or any other water-insoluble liquid, may be used as the oil in preparing the emulsifiable oils of this invention.

To demonstrate the usefulness and practicality of this invention, the emulsifiable oils produced as described hereinbefore were subjected to the Government Emulsion Test described in Federal Stock Catalogue, section IV, part 5, Federal Specifications VV-L-791b, February 19, 1942. In this test, 40 milliliters of the petroleum base stock containing a minor proportion of emulsifier and 40 milliliters of water were placed in a 100-milliliter graduated cylinder heated to a temperature of 130° F. and agitated at 1500 R. P. M. for 5 minutes. Separation of the emulsion was observed while the cylinder was kept at 130° F. for the specified time. The number of milliliters of emulsion remaining after periods of 30 minutes and of one hour were recorded. The emulsive characteristics of the blends undergoing test are determined by the number of milliliters of emulsion present at the end of the aforementioned test periods, as compared with a blank consisting of uninhibited base oil. The results of testing the reaction products of the examples are set forth in the following table:

| Product of Example | Govt. Emulsion Test on Oil Blends Containing 0.05% Reaction Product | | Govt. Emulsion Test on Oil Blends Containing 0.2% Reaction Product | |
|---|---|---|---|---|
| | Ml. Emulsion at 30 Min. | Ml. Emulsion at 1 Hour | Ml. Emulsion at 30 Min. | Ml. Emulsion at 1 Hour |
| Blank | 48 | 40 | 48 | 40 |
| 2 | 80 | 79 | 80 | 80 |
| 3 | 80 | 78 | 78 | 78 |
| 4 | | | 79 | 80 |
| 5 | 80 | 78 | 78 | 76 |
| 6 | 80 | 80 | 80 | 80 |
| 7 | 80 | 79 | 79 | 78 |
| 8 | 63 | 48 | 52 | 48 |
| 9 | 67 | 59 | | |
| 10 | 64 | 60 | 50 | 46 |
| 11 | 61 | 46 | 80 | 80 |
| 12 | 74 | 66 | 80 | 80 |
| 13 | 67 | 59 | | |
| 14 | 70 | 59 | 80 | 80 |
| 15 | 75 | 75 | 77 | 73 |
| 16 | 78 | 77 | 77 | 74 |
| 17 | 73 | 59 | 76 | 73 |

From the foregoing test results, it will be seen that the reaction products of an aliphatic monocarboxylic acid with a polyalkylenepolyamine are effective emulsifying agents for producing emulsions of the water-in-oil type. Emulsifiable oils containing them produce emulsions which are stable for long periods of time, even under conditions of relatively high temperatures and pressures. Accordingly, such oils are particularly useful for lubricating moving parts under conditions wherein emulsions are desirable, such as in steam cylinder lubrication and the like. Also, these oils can be used to produce emulsions useful for treating textiles, in waterproofing materials, in coating paper, and in similar operations.

Further examples of the preparation and utility of the reaction products contemplated herein are set forth in two copending applications of the present inventors. One application, Serial Number 127,278, filed November 14, 1949, now Patent Number 2,568,876, relates to antirust agents produced by reacting a monocarboxylic acid with a polyalkylenepolyamine to produce an intermediate product, and by further reacting this intermediate product with an alkenyl succinic acid anhydride. The other application, Serial Number 122,353, filed October 19, 1949, is concerned with gasolines containing the reaction product of a polyalkylenepolyamine with an aliphatic monocarboxylic acid having between about eight and about thirty carbon atoms per molecule. The reaction product, per se, is claimed in the latter application.

Although the present invention has been described with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. An emulsifiable oil which comprises an oil containing between about 0.01 per cent and about 10 per cent, by weight, of the reaction product obtained by reacting an aliphatic monocarboxylic acid having between about 14 carbon atoms and about 30 carbon atoms per molecule with a polyalkylenepolyamine having one more nitrogen atom per molecule than there are alkylene groups in the molecule, in a molar proportion varying between about 1:1, respectively, and about X:1, respectively, X representing the number of nitrogen atoms in the polyalkylenepolyamine molecule, at a temperature of between about 60° C. and about 200° C., and for a period of time of between about 4 hours and about 16 hours; which said emulsifiable oil forms an emulsion of the water-in-oil type.

2. An emulsifiable oil which comprises an oil containing between about 0.01 per cent and about 10 per cent, by weight, of the reaction product obtained by reacting an aliphatic monocarboxylic acid having between about 14 carbon atoms and about 18 carbon atoms per molecule with a polyalkylenepolyamine having one more nitrogen atom per molecule than there are alkylene groups in the molecule, in a molar proportion varying between about 1:1, respectively, and about X:1, respectively, X representing the number of nitrogen atoms in the polyalkylenepolyamine molecule, at a temperature of between about 130° C. and about 160° C., and for a period of time of between about 4 hours and about 16 hours; which said emulsifiable oil forms an emulsion of the water-in-oil type.

3. An emulsifiable oil which comprises an oil containing between about 0.01 per cent and about 10 per cent, by weight, of the reaction product obtained by reacting an aliphatic monocarboxylic acid having between about 14 carbon atoms and about 18 carbon atoms per molecule with a polyethylenepolyamine having one more nitrogen atom per molecule than there are ethylene groups in the molecule and having between about two and about six ethylene groups per molecule, in a molar proportion varying between about 1:1, respectively, and about (X:1):1, respectively, X representing the number of nitrogen atoms in the polyethylenepolyamine molecule, at a temperature of between about 130° C. and about 160° C., and for a period of time of between about 4 hours and about 16 hours; which said emulsifiable oil forms an emulsion of the water-in-oil type.

4. The emulsifiable oil defined in claim 1, wherein the oil is a vegetable oil.

5. The emulsifiable oil defined in claim 1, wherein the oil is an animal oil.

6. The emulsifiable oil defined in claim 1, wherein the oil is a mineral lubricating oil.

7. The emulsifiable oil defined in claim 2, wherein the oil is a mineral lubricating oil.

8. The emulsifiable oil defined in claim 3, wherein the oil is a mineral lubricating oil.

9. An emulsifiable oil which comprises a mineral lubricating oil containing between about 0.01 per cent and about 10 per cent, by weight, of the reaction product obtained by reacting stearic acid with tetraethylenepentamine, in a molar proportion varying between about 1:1, respectively, and about 4:1, respectively, at a temperature of between about 130° C. and about 160° C., and for a period of time of between about 4 hours and about 16 hours; which said emulsifiable oil forms an emulsion of the water-in-oil type.

10. An emulsifiable oil which comprises a mineral lubricating oil containing between about 0.01 per cent and about 10 per cent, by weight, of the reaction product obtained by reacting myristic acid with triethylenetetramine, in a molar proportion varying between about 1:1, respectively, and about 3:1, respectively, at a temperature of between about 130° C. and about 160° C., and for a period of time of between about 4 hours and about 16 hours; which said emulsifiable oil forms an emulsion of the water-in-oil type.

11. An emulsifiable oil which comprises a mineral lubricating oil containing between about 0.01 per cent and about 10 per cent, by weight, of the reaction product obtained by reacting oleic acid with diethylenetriamine, in a molar proportion varying between about 1:1, respectively, and about 2:1, respectively, at a temperature of between about 130° C. and about 160° C., and for a period of time of between about 4 hours and about 16 hours; which said emulsifiable oil forms an emulsion of the water-in-oil type.

RALPH V. WHITE.
PHILLIP S. LANDIS.

REFERENCES CITED

The following references are of record in the file of this patent:

UNITED STATES PATENTS

| Number | Name | Date |
|---|---|---|
| 2,214,152 | Wilkes | Sept. 10, 1940 |
| 2,355,837 | Wilson | Aug. 15, 1944 |
| 2,493,483 | Francis et al. | Jan. 3, 1950 |